United States Patent
Kamler (10) Patent No.: US 11,325,155 B2
(45) Date of Patent: May 10, 2022

(54) IMMERSIBLE ULTRASONIC TRANSMITTER

(71) Applicant: VENTORA TECHNOLOGIES AG, Hergiswil (CH)

(72) Inventor: Anna Vladimirovna Kamler, Moscow (RU)

(73) Assignee: VENTORA TECHNOLOGIES AG, Hergiswil (CH)

(*) Notice: Subject to any disclaimer, the term of this patent is extended or adjusted under 35 U.S.C. 154(b) by 225 days.

(21) Appl. No.: 16/755,084

(22) PCT Filed: Oct. 10, 2017

(86) PCT No.: PCT/RU2017/000750
§ 371 (c)(1),
(2) Date: Apr. 9, 2020

(87) PCT Pub. No.: WO2019/074390
PCT Pub. Date: Apr. 18, 2019

(65) Prior Publication Data
US 2020/0240226 A1    Jul. 30, 2020

(51) Int. Cl.
*H04R 17/00* (2006.01)
*B06B 1/06* (2006.01)
(Continued)

(52) U.S. Cl.
CPC ............ *B06B 1/0611* (2013.01); *E21B 28/00* (2013.01); *E21B 43/003* (2013.01); *E21B 43/25* (2013.01); *H04R 17/00* (2013.01)

(58) Field of Classification Search
CPC ...................................................... H04R 17/00
See application file for complete search history.

(56) References Cited

U.S. PATENT DOCUMENTS

| 7,063,144 B2 | 6/2006 | Abramov et al. |
| 2013/0068525 A1* | 3/2013 | DiGiovanni ............ E21B 10/55 175/40 |

(Continued)

FOREIGN PATENT DOCUMENTS

| EA | 012695 B1 | 12/2009 |
| RU | 2172819 C1 | 8/2001 |

(Continued)

*Primary Examiner* — Olisa Anwah (57) ABSTRACT

An immersible ultrasonic transmitter consists of an end element of a first type, an end element of a second type and at least one transmitting member. The end element of the first type comprises a first cylindrical transmitter, a stack of piezoelectric elements, a second cylindrical transmitter and a coupling element with a threaded connection for coupling together the two cylindrical transmitters. The transmitting member contains a stack of piezoelectric elements, a cylindrical transmitter of a transmitting member, and an element with a threaded connection for coupling together the cylindrical transmitter of a transmitting member and the cylindrical transmitter of an adjacent transmitting member, or the second cylindrical transmitter of the end element of the first type. The end element of the second type comprises a first cylindrical transmitter, a stack of piezoelectric elements and a coupling element with a threaded connection for coupling together the cylindrical transmitter and the cylindrical transmitter of an adjacent transmitting member.

13 Claims, 9 Drawing Sheets

(51) Int. Cl.
 *E21B 28/00* (2006.01)
 *E21B 43/00* (2006.01)
 *E21B 43/25* (2006.01)

(56) References Cited

U.S. PATENT DOCUMENTS

| | | |
|---|---|---|
| 2013/0146281 A1 | 6/2013 | Noui-Mehidi et al. |
| 2015/0369037 A1* | 12/2015 | Jones .................. E21B 47/085 |
| | | 175/40 |
| 2017/0293044 A1* | 10/2017 | Gilstrap .................. F16B 2/22 |
| 2017/0299751 A1* | 10/2017 | Chang ..................... G01V 1/44 |
| 2017/0342817 A1* | 11/2017 | Tello ..................... E21B 47/005 |
| 2018/0015505 A1* | 1/2018 | Stevenson ........... H01L 41/0825 |
| 2019/0153800 A1* | 5/2019 | Song ....................... E21B 44/00 |
| 2020/0003924 A1* | 1/2020 | Jin ......................... G01V 1/159 |

FOREIGN PATENT DOCUMENTS

| | | |
|---|---|---|
| RU | 2332266 C1 | 8/2008 |
| SU | 313192 A1 | 8/1971 |
| WO | 2017/009075 A1 | 1/2017 |

\* cited by examiner

FIG. 9

IMMERSIBLE ULTRASONIC TRANSMITTER

CROSS-REFERENCE TO RELATED APPLICATIONS

This application is a U.S. National Phase Application under 35 U.S.C. § 371 of International Application No. PCT/RU2017/000750, filed Oct. 10, 2017, entitled IMMERSIBLE ULTRASONIC TRANSMITTER, the contents of which are incorporated herein by reference.

The invention relates to the oil industry, and namely to devices for generating acoustic oscillations.

In recent years, the development of the oil industry is characterized by a significant increase in hard-to-recover oil reserves. The hard-to-recover reserves are those that can not be effectively exploited using traditional development methods. The current state of development of oil fields necessitates a large amount of work to improve oil recovery and to increase well productivity. The results of geophysical and hydrodynamic studies show that the productivity of wells during operation decreases, despite taking various geological and technological measures. The main emphasis is made on the use of such methods to increase oil production levels as hydraulic fracturing, forced fluid withdrawal, sidetracking, and lateral drilling. There is no doubt that these methods have a high technical and economic efficiency but their success is manifested not in all cases, therefore, the task to introduce technologies for enhanced oil recovery is critical [Apasov T. K. Analysis of Hydraulic Fracturing by the Example of the Jurassic Seams. Oil and Gas of Western Siberia. Volume 1.—Tyumen: TSOGU,—2003.—Page 98.].

Physical methods are acquiring an increasingly important place among modern methods of enhanced oil recovery. Acoustic treatment methods are the most developed in the theoretical as well as instrumental and technological aspects in this group today, especially while stimulating a formation and a bottomhole formation zone from wells, acoustic ones in the ultrasonic range being among them [Mel'nikov V. B. Prospects for Using Wave Technologies in Oil and Gas Branches, Russian State University of Oil and Gas named after I. M. Gubkin. Academic Readings, Moscow—2007; Akulichev V. A. On the Growth of the Cavitation Strength of a Real Fluid: Acoustic Journal. 1965, No. 11—pages 719-723.].

Acoustic devices, including ultrasonic ones, are used in various industries. In particular, the ultrasonic devices are used in oil production. At the same time, it is possible to place an ultrasonic device in a well to generate acoustic oscillations.

The generation of ultrasonic waves in a well leads to the heating of a bottomhole formation zone (BHFZ), a decrease in oil viscosity, an increase in permeability and an enhancement in fluid mobility. An ultrasonic method of enhanced oil recovery can be used in combination with such methods as: a thermal method (heating the BHFZ by various methods), a chemical method (injecting various reagents into the formation) (example: US 2013/0146281 published on Jun. 13, 2013). An example of a device for generating ultrasonic oscillations in a well is described in U.S. Pat. No. 7,063,144 "Acoustic Well Recovery Method and Device". However, a transmission zone and efficiency of this device are limited. It is necessary to maximize the transmission zone of the device and its efficiency in the case of horizontal wells. This is related to the fact that a BHFZ length of a horizontal well is much greater than a BHFZ length of a vertical one. It is possible to achieve reduced processing time by increasing the efficiency of the device and the transmission zone length, which leads to a cheaper operation.

The introduction of ultrasonic treatment of a bottomhole zone of an oil formation is widely reflected in the scientific and technical literature. Thus, the use of ultrasonic downhole equipment for the oil production intensification is described, which is a downhole apparatus made in the form of a cylindrical structure (Oilfield Engineering, 2012, page 25. Ultrasonic Technology for Improving the Productivity of Low-Yield Wells, by M. S. Mullakaev, V. O. Abramov et al.). A waveguide, in which a standing wave is excited at idle, is arranged in the central part of the device. This is achieved by using two transducers soldered to the ends of the waveguide. The resulting radial oscillations of the waveguide create an elastic high-frequency field in the environment. The oscillation frequency is 20 Hz. The device is effective when working with high-paraffin crude oils but the transmission zone is limited by the distance between the two transducers, which, in its turn, is limited by the power of the transducers.

The patent No. RU 2172819 "Method for the Development of a Watered Oil Field and Device for Vibroseismic Treatment of this Field" is known. The invention relates to the oil industry, in particular to methods for the development of mature watered fields and devices for their implementation. The essence of the invention is the following: a formation is opened with wells and a formation fluid is extracted with production wells. A fractional composition of the rock forming the oil formation is studied by analyzing the core material and the dominant frequency of the formation is determined in the area of the hydrocarbon deposit. A complex of technical means for vibroseismic treatment is mounted. It includes the installation of a waveguide device in a stimulating well from current ones or in a specially drilled well and coupling together the waveguide device and a land-based wave source of a vibration type with an adjustable value of an oscillation frequency and an amplitude. The vibroseismic treatment is carried out at the dominant frequency with the simultaneous registration of the composition and the amount of the extracted fluid and associated gas, the amplitude spectrum of acoustic noise and the amplitude of rock vibration displacements in an interval of the hydrocarbon-bearing formation having the largest residual oil reserves. According to the results of processing the amplitude spectrum of the acoustic noise and the dynamics of technological indicators of the development, the modes of optimal vibration treatment of the deposit are determined. The field is divided into areas of the effective action of the complex of technical means for vibroseismic treatment, including the land-based source and the waveguide device, and additional complexes are mounted on them. The vibroseismic treatment is carried out with the simultaneous periodic injections of solutions containing dissolved gas into the intervals of the formation in the areas. Treatments of the bottomhole formation zones, including vibrowave ones, improving their filtration properties are carried out during the vibroseismic treatment. Repeated sessions of the vibroseismic treatment are carried out in these areas until the development of these areas is completely ceased. The device according to the method includes a land-based wave source of a vibration type. It consists of a power supply and control system comprising an error signal amplifier, an electromechanical transducer, a hydraulic amplifier, and a vibration exciter. It is rigidly connected to a support pipe centered relative to the wellhead. Its transmitting element is connected via an attached mass with an elastic waveguide. It is connected to a quarter-wave transmitter by the bottom end. When the wave source is turned on, the power supply and control system controls the fluid flows entering the vibration exciter and oscillates its transmitting element that transfers the oscillations to the attached mass, which ensures wave propagation through the waveguide to the quarter-wave transmitter, where they are transmitted into the oil formation by the device for rigidly connecting to the casing walls. The technology provides an enhancement in the final oil recovery by restoring the mobility of trapped oil and an increase in the vibroseismic treatment coverage while optimizing its modes. However, the efficiency of the method is limited due to the need to transfer mechanical oscillations to a greater length through the attached mass.

The closest technical solution of the claimed device is a device described in the application No. WO 2017/009075 A1 (A Downhole Ultrasonic Transducer, Downhole Probe and Tool Comprising such a Transducer), the priority of Jan. 19, 2017.

The immersible (downhole) ultrasonic transducer described in the application No. WO 2017/009075 A1, used to transmit and/or receive ultrasonic waves in a well of a hydrocarbon field in which a fluid is present, consists of a metal body comprising an internal cavity that is isolated from the fluid of the well of the hydrocarbon field with a membrane wall made of a metal alloy; a piezoelectric element fixed inside the internal cavity, the piezoelectric element having a front side mechanically connected to the membrane wall, the internal cavity being under pressure not related to the pressure in the well of the hydrocarbon field, wherein the transducer has a rear side of the piezoelectric element arranged in such a way that nothing prevents its free oscillations in the internal cavity in order to create a high acoustic impedance between the piezoelectric element and the internal cavity on the rear side and to maximize the transfer of acoustic energy to the front side, and the membrane wall thickness is such that there is a general resonance of the membrane wall and the piezoelectric element, which leads to effective transmission of acoustic waves through the membrane wall, and is such that the membrane wall is capable of resisting the pressure in the well of the hydrocarbon field.

In other words, the immersible ultrasonic transducer has a cavity in which the piezoelectric element is arranged. At the same time, this element is in acoustic contact with the membrane wall of the ultrasonic transducer, the second end of the piezoelectric element is free and is arranged in the cavity. The natural frequency of the membrane wall coincides with the frequency of the piezoelectric element.

Disadvantages of the prior art solution are a relatively low efficiency of energy transfer into the formation caused by the fact that the transmitting element is solely the membrane wall in such configuration. The size of the transmission zone is limited by the size of the membrane wall and the piezoelectric element itself in this case. If this structure is used for the stimulation of a bottomhole formation zone, the time of the required stimulation will be determined by a ratio of the thickness of the bottomhole formation zone and the size of the membrane wall. The time calculated in such a way will be tens of hours for a typical well.

An objective of the invention is to eliminate the disadvantages mentioned above, and namely increasing efficiency by increasing the transmission zone of the device. The posed problem is solved by the proposed immersible ultrasonic transmitter.

Figure 1:
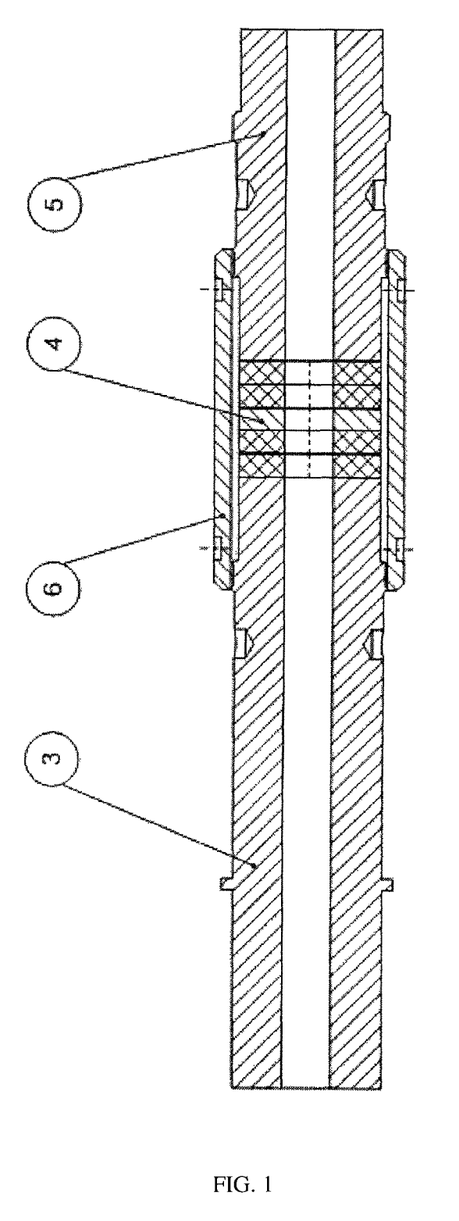
FIG. 1 shows an end element of a first type (1).
Figure 2:
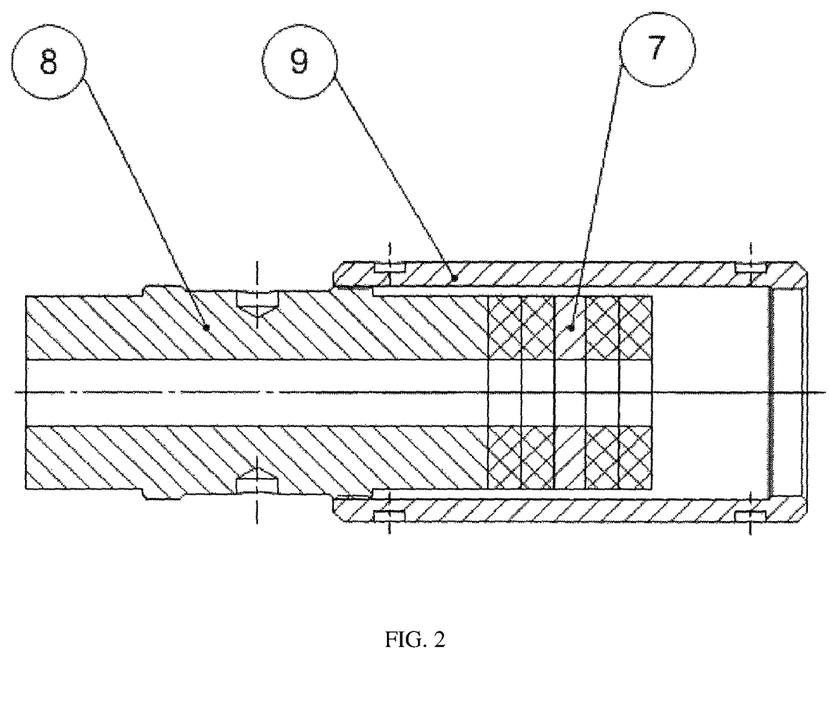
FIG. 2 shows a transmitting member (2).
Figure 3:
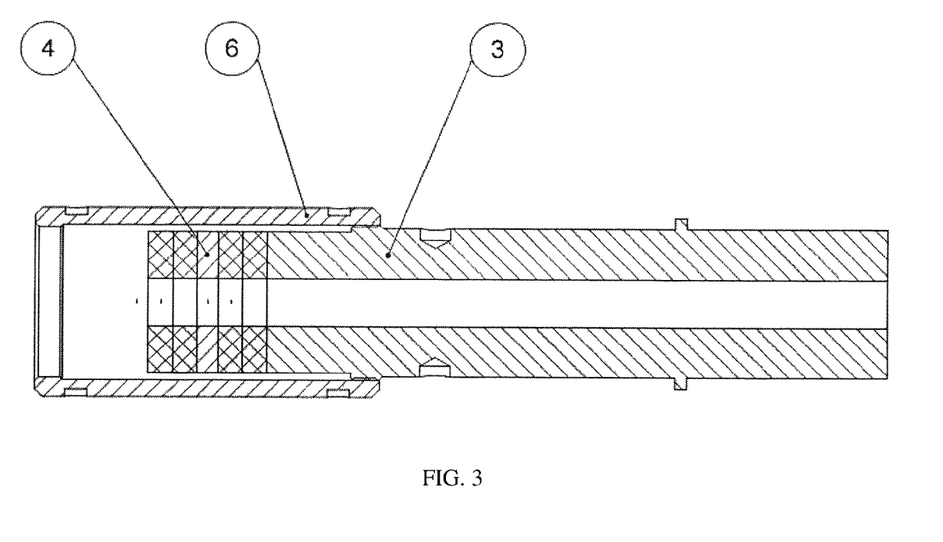
FIG. 3 demonstrates an end element of a second type (15).
Figure 4:
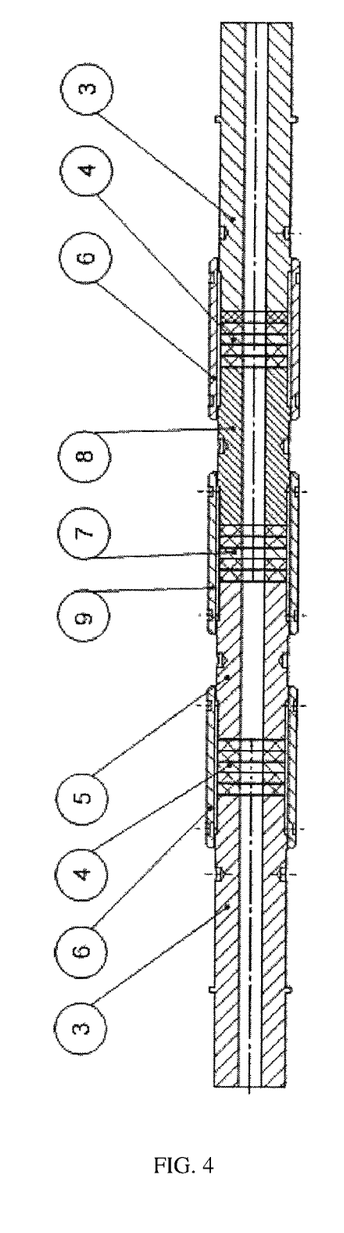
FIG. 4 shows an immersible ultrasonic transmitter.

According to the claimed technical solution, an immersible ultrasonic transmitter consists of an end element of a first type (1), an end element of a second type (15) and at least one transmitting member (2); wherein the end element of the first type (1) comprises a first cylindrical transmitter (3), a stack of piezoelectric elements (4), a second cylindrical transmitter (5) and a coupling element (6) with a threaded connection for coupling together the two cylindrical transmitters, the stack of piezoelectric elements (4) being arranged between the two cylindrical transmitters (3) and (5) inside the coupling element (6), wherein the length of a section from the beginning of the first cylindrical transmitter (3) to the middle of the second cylindrical transmitter (5) is $\lambda \pm 10\%$, where $\lambda$ is the wavelength of the longitudinal oscillation mode of the immersible ultrasonic transmitter at its operating frequency;

wherein the transmitting member (2) comprises a stack of piezoelectric elements (7), a cylindrical transmitter (8) of the transmitting member and a coupling element (9) with a threaded connection for coupling together the cylindrical transmitter (8) of the transmitting member and the cylindrical transmitter (8) of an adjacent transmitting member, or the second cylindrical transmitter (5) of the end element of the first type (1), the stack of piezoelectric elements (7) being arranged between the two cylindrical transmitters (8) and (8) or (8) and (5) inside the coupling element (9), wherein the length of the cylindrical transmitter (8) of the transmitting member is proportional to the length of the second cylindrical transmitter (5) of the end element (1), the length of the coupling element (9) of the transmitting member (2) is proportional to the length of the coupling element (6) of the end element (1), the stack of piezoelectric elements (7) of the transmitting member (2) is identical to the stack of piezoelectric elements (4) of the end element (1);

wherein the end element of the second type (15) comprises the first cylindrical transmitter (3), the stack of piezoelectric elements (4), and the coupling element (6) with a threaded connection for coupling together the cylindrical transmitter (3) and the cylindrical transmitter (8) of the adjacent transmitting member, the stack of piezoelectric elements (4) being arranged between the cylindrical transmitters (3) and (8) inside the coupling element (6);

the distance between the middles of the adjacent cylindrical transmitters (8) of the transmitting members (2) or between the adjacent cylindrical transmitter (8) of the transmitting member (2) and the second cylindrical transmitter (5) of the end element of the first type (1) is half the wavelength±10% ($\lambda/2\pm10\%$) of the longitudinal oscillation mode of the immersible ultrasonic transmitter at its operating frequency, and the natural frequency of the longitudinal oscillations of the coupling elements (6) and (9) coincides with the operating frequency of the immersible ultrasonic transmitter.

The threads on the two ends of the coupling elements (6) or (9) can be made in different directions in the immersible ultrasonic transmitter.

Figure 5:
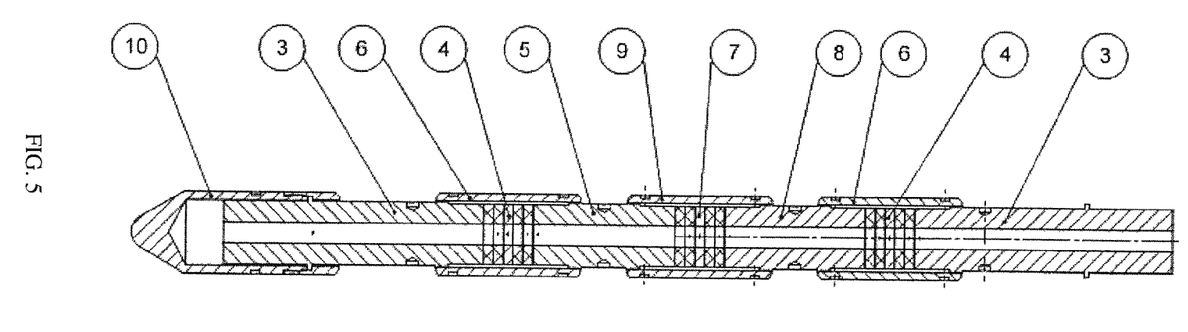
FIG. 5 demonstrates the immersible ultrasonic transmitter in which a protective cover (10) is fixed in a unit on the displacements of the longitudinal oscillations at the operating frequency on a first cylindrical transmitter (3) of the end element of the first type (1).

A protective cover (10) may be fixed in a unit on the displacements of the longitudinal oscillations at the operating frequency on the first cylindrical transmitter (3) of the end element of the first type (1) or of the end element of the second type (15), the cover comprising a cylindrical hole with a conical end and not being in acoustic contact with the cylindrical transmitter.

Figure 6:
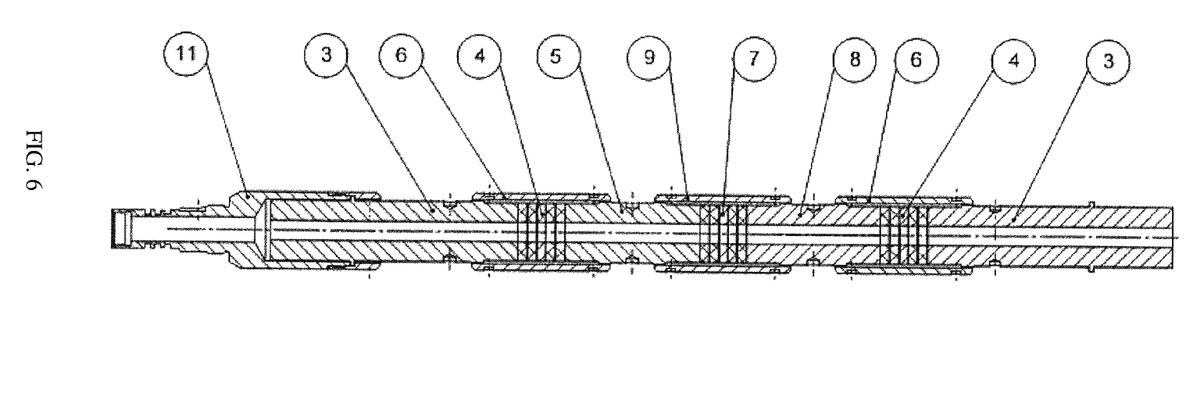
FIG. 6 shows the immersible ultrasonic transmitter in which a cable shoe (11) is fixed in the unit on the displacements of the longitudinal oscillations at the operating frequency on the first cylindrical transmitter (3) of the end element of the second type (15).

A cable shoe (11) may be fixed in the unit on the displacements of the longitudinal oscillations at the operating frequency on the first cylindrical transmitter (3) of the end element of the second type (15) or of the end element of the first type (1), the cable shoe not being in acoustic contact with the cylindrical transmitter.

The immersible ultrasonic transmitter may comprise an even number of the transmitting members (2).

Figure 7:
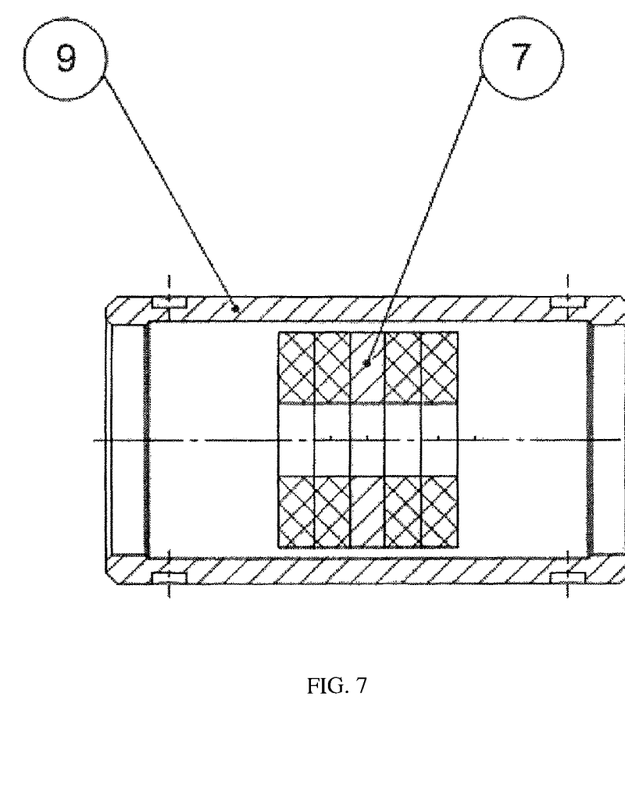
FIG. 7 demonstrates a transmitting member of a second type (16).
Figure 8:
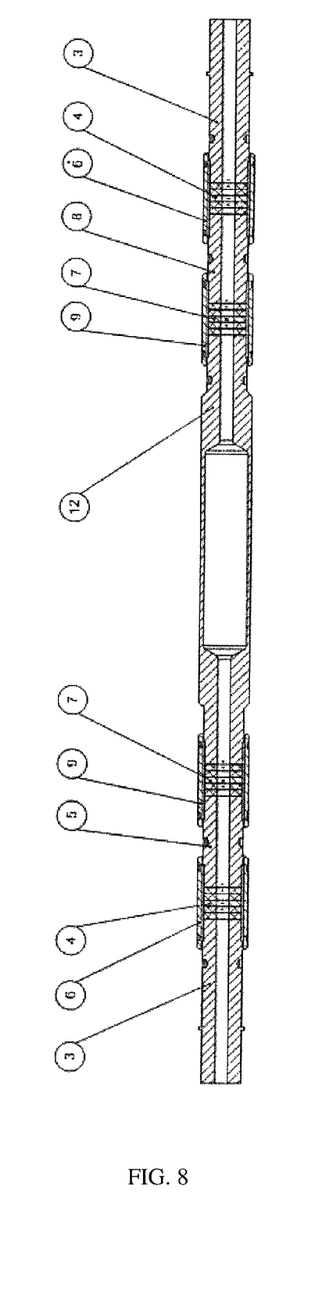
FIG. 8 shows the immersible ultrasonic transmitter comprising an odd number of the transmitting members (2) and further comprising the transmitting member of the second type (16) and a waveguide member (12).

Furthermore, according to the claimed invention, the immersible ultrasonic transmitter may comprise an odd number of the transmitting members (2) as well. At the same time, the immersible ultrasonic transmitter further comprises a transmitting member of a second type (16) and a waveguide member (12) arranged between the transmitting member of the second type (16) and the transmitting member (2) in the middle of the immersible ultrasonic transmitter, wherein the transmitting member of the second type comprises a stack of piezoelectric elements (7) and a coupling element (9) for coupling together the cylindrical transmitter (8) of the adjacent transmitting member and the waveguide member (12), and the coupling element (9) of the transmitting member (2) being adjacent to the waveguide member couples together the waveguide member and the cylindrical transmitter (8) of the transmitting member.

The waveguide member (12) may be made in the form of a hollow cylindrical transmitter ending with elements being similar in shape to a half of the cylindrical transmitter (8) of the transmitting member. In this case, it may be configured to excite oscillations at the ends in antiphase.

Figure 9:
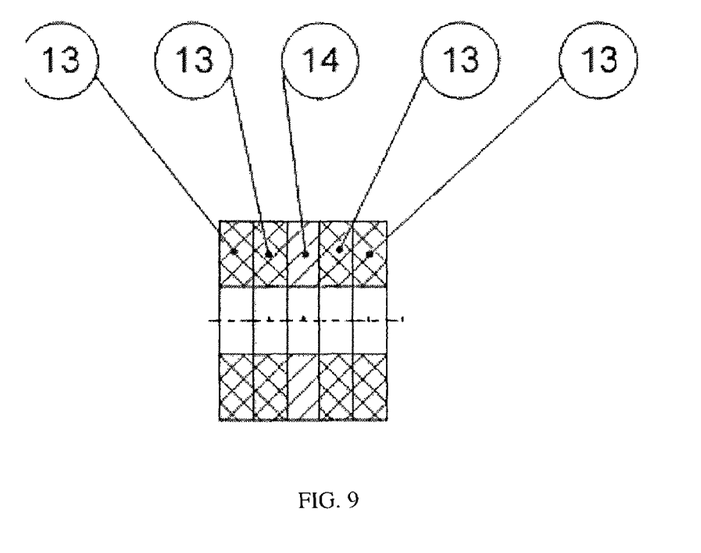
FIG. 9 shows a stack of piezoelectric elements (7) or (4) consisting of two pairs of piezoelectric elements (13) separated by a metal cylindrical element (14).

A stack of piezoelectric elements (7) or (4) in the immersible ultrasonic transmitter may consist of an even number of piezoelectric elements (13) and a metal cylindrical element (14).

The immersible ultrasonic transmitter may comprise a stack of piezoelectric elements (7) or (4) consisting of two pairs of the piezoelectric elements (13) separated by the metal cylindrical element (14). The pairs of the piezoelectric elements may be arranged in such a way that the elements (13) are in contact by contacts of different polarity with each other, and by contacts of the same polarity with the metal cylindrical element (14). The stacks of piezoelectric elements (4) or (7) of different members may be connected in parallel.

Another aspect of the invention is the use of the immersible ultrasonic transmitter for the ultrasonic treatment of a bottomhole formation zone of a hydrocarbon field.

Figures are images of both the immersible ultrasonic transmitter itself and its elements.

The immersible ultrasonic transmitter is designed, among other things, for operation in wells. One of the main applications of the device is the use in oil wells for the treatment of a bottomhole formation zone. The purpose of this treatment is to increase the flow rate of the treated well.

The immersible ultrasonic transmitter can be used, in particular, for the treatment of horizontal wells with a perforation zone of several tens or hundreds of meters. Treatment duration is extremely important for the wells of this type. The proposed device makes it possible to increase the transmission zone, which is arranged along the entire length of the immersible ultrasonic transmitter. It is possible to reduce the treatment time of the BHFZ by increasing the transmission zone. The increase in the transmission zone is achieved by matching the lengths of the individual elements of the transmitter.

Thus, the distance between the middles of the adjacent cylindrical transmitters (8) of the transmitting members (2) or between the adjacent cylindrical transmitter (8) of the transmitting member (2) and the second cylindrical transmitter (5) of the end element of the first type (1) is half the wavelength±10% ($\lambda/2\pm10\%$) of the longitudinal oscillation mode of the immersible ultrasonic transmitter at its operating frequency.

Furthermore, the natural frequency of the longitudinal oscillations of the coupling elements (6) and (9) coincides with the operating frequency of the immersible ultrasonic transmitter. The natural frequency of the longitudinal oscillations of the coupling elements is uniquely determined by the geometrical dimensions of the coupling elements. Thus, the described ratio of the lengths of the elements makes it possible to increase the transmission zone of the immersible ultrasonic transmitter, which is an undoubted advantage of the claimed device as compared with the prior art solution.

In addition, the proposed ratio of the lengths of the elements of the immersible ultrasonic transmitter makes it possible to increase the efficiency of transmission of oscillations of the piezoelectric elements into the formation, which is explained by resonance phenomena.

The pairs of the piezoelectric elements may be arranged in the proposed device in such a way that the elements (13) are in contact by the contacts of different polarity with each other, and by the contacts of the same polarity with the metal cylindrical element (14). This makes it possible to increase the electrical resistance of the stacks. Such increase allows increasing the possible depth of the transmitter operation, which is limited by the capability of transmitting an electrical signal from the surface via a long cable. The increase in the resistance is usually achieved by increasing the number of piezoceramic elements that are traditionally in contact by contacts of the same polarity with each other. The increase in the number of the piezoelectric elements leads to an increase in the geometric dimensions of the device. The size of the device is limited by the dimensions of the well, thus, the dimensions of the well impose a restriction on the possible depth of treatment. If the proposed configuration of the piezoelectric elements is used, this restriction is removed.

Thus, the claimed immersible ultrasonic transmitter has a higher efficiency due to the increase in the transmission zone of the device. The device makes it possible to increase the flow rate of the treated well. It may be used, in particular, for the treatment of horizontal wells with a perforation zone of several tens or hundreds of meters.

The invention claimed is:

1. An immersible ultrasonic transmitter consisting of an end element of a first type (1), an end element of a second type (15) and at least one transmitting member (2); wherein the end element of the first type (1) comprises a first cylindrical transmitter (3), a stack of piezoelectric elements (4), a second cylindrical transmitter (5) and a coupling element (6) with a threaded connection for coupling together the two cylindrical transmitters, the stack of piezoelectric elements (4) being arranged between the two cylindrical transmitters (3) and (5) inside the coupling element (6), wherein the length of a section from the beginning of the first cylindrical transmitter (3) to the middle of the second cylindrical transmitter (5) is $\lambda \pm 10\%$, where $\lambda$ is the wavelength of the longitudinal oscillation mode of the immersible ultrasonic transmitter at its operating frequency;

wherein the transmitting member (2) comprises a stack of piezoelectric elements (7), a cylindrical transmitter (8) of the transmitting member and a coupling element (9) with a threaded connection for coupling together the cylindrical transmitter (8) of the transmitting member and the cylindrical transmitter (8) of an adjacent transmitting member, or the second cylindrical transmitter (5) of the end element of the first type (1), the stack of piezoelectric elements (7) being arranged between the two cylindrical transmitters (8) and (8) or (8) and (5) inside the coupling element (9), wherein the length of the cylindrical transmitter (8) of the transmitting member is proportional to the length of the second cylindrical transmitter (5) of the end element (1), the length of the coupling element (9) of the transmitting member (2) is proportional to the length of the coupling element (6) of the end element (1), the stack of piezoelectric elements (7) of the transmitting member (2) is identical to the stack of piezoelectric elements (4) of the end element (1);

wherein the end element of the second type (15) comprises the first cylindrical transmitter (3), the stack of piezoelectric elements (4), and the coupling element (6) with a threaded connection for coupling together the cylindrical transmitter (3) and the cylindrical transmitter (8) of the adjacent transmitting member, the stack of piezoelectric elements (4) being arranged between the cylindrical transmitters (3) and (8) inside the coupling element (6);

the distance between the middles of the adjacent cylindrical transmitters (8) of the transmitting members (2) or between the adjacent cylindrical transmitter (8) of the transmitting member (2) and the second cylindrical transmitter (5) of the end element of the first type (1) is half the wavelength$\pm 10\%$ ($\lambda/2 \pm 10\%$) of the longitudinal oscillation mode of the immersible ultrasonic transmitter at its operating frequency, and the natural frequency of the longitudinal oscillations of the coupling elements (6) and (9) coincides with the operating frequency of the immersible ultrasonic transmitter.

2. The immersible ultrasonic transmitter according to claim 1, characterized in that the threads on the two ends of the coupling elements (6) or (9) are made in different directions.

3. The immersible ultrasonic transmitter according to claim 1, characterized in that a protective cover (10) is fixed in a unit on the displacements of the longitudinal oscillations at the operating frequency on the first cylindrical transmitter (3) of the end element of the first type (1) or on the first cylindrical transmitter (3) of the end element of the second type (15), the cover being not in acoustic contact with the cylindrical transmitter.

4. The immersible ultrasonic transmitter according to claim 1, characterized in that a cable shoe (11) is fixed in the unit on the displacements of the longitudinal oscillations at the operating frequency on the first cylindrical transmitter (3) of the end element of the second type (15) or on the first cylindrical transmitter (3) of the end element of the first type (1), the cable shoe not being in acoustic contact with the cylindrical transmitter.

5. The immersible ultrasonic transmitter according to claim 1, characterized in that it comprises an even number of the transmitting members (2).

6. The immersible ultrasonic transmitter according to claim 1, characterized in that it comprises an odd number of the transmitting members (2) and further comprises a transmitting member of a second type (16) and a waveguide member (12) arranged between the transmitting member of the second type (16) and the transmitting member (2) in the middle of the immersible ultrasonic transmitter, wherein the transmitting member of the second type comprises a stack of piezoelectric elements (7) and a coupling element (9) for coupling together the cylindrical transmitter (8) of the adjacent transmitting member and the waveguide member (12), and the coupling element (9) of the transmitting member (2) being adjacent to the waveguide member couples together the waveguide member and the cylindrical transmitter (8) of the transmitting member.

7. The immersible ultrasonic transmitter according to claim 6, characterized in that the waveguide member (12) is made in the form of a hollow cylindrical transmitter ending with elements being similar in shape to a half of the cylindrical transmitter (8) of the transmitting member.

8. The immersible ultrasonic transmitter according to claim 6, characterized in that the waveguide member (12) is configured to excite oscillations at the ends in antiphase.

9. The immersible ultrasonic transmitter according to claim 1, characterized in that the stack of piezoelectric elements (7) or (4) consists of an even number of piezoelectric elements (13) and a metal cylindrical element (14).

10. The immersible ultrasonic transmitter according to claim 9, characterized in that the stack of piezoelectric elements (7) or (4) consists of two pairs of the piezoelectric elements (13) separated by the metal cylindrical element (14).

11. The immersible ultrasonic transmitter according to claim 10, characterized in that the pairs of the piezoelectric elements are arranged in such a way that the elements (13) are in contact by contacts of different polarity with each other, and by contacts of the same polarity with the metal cylindrical element (14).

12. The immersible ultrasonic transmitter according to claim 1, characterized in that the stacks of piezoelectric elements (4) or (7) of different members are connected in parallel.

13. A method comprising treating a bottomhole formation zone of a hydrocarbon field with the immersible ultrasonic transmitter of claim 1.

* * * * *